(12) United States Patent
Venezia

(10) Patent No.: US 7,793,617 B2
(45) Date of Patent: Sep. 14, 2010

(54) COLLAPSIBLE WILDLIFE CONTAINMENT APPARATUS

(76) Inventor: Alberto J. Venezia, 18618 Cape Sable Dr., Boca Raton, FL (US) 33498

( * ) Notice: Subject to any disclaimer, the term of this patent is extended or adjusted under 35 U.S.C. 154(b) by 400 days.

(21) Appl. No.: 11/752,604

(22) Filed: May 23, 2007

(65) Prior Publication Data

US 2007/0277742 A1   Dec. 6, 2007

Related U.S. Application Data

(60) Provisional application No. 60/809,759, filed on May 31, 2006.

(51) Int. Cl.
  *A01K 63/00*   (2006.01)
(52) U.S. Cl. ................ 119/269; 119/246
(58) Field of Classification Search .......... 119/269, 119/246, 474, 498, 245; 220/9.2; 47/69
  See application file for complete search history.

(56) References Cited

U.S. PATENT DOCUMENTS

| | | | | |
|---|---|---|---|---|
| 3,176,982 A * | 4/1965 | O'Daniell | ............... | 472/128 |
| 3,269,578 A * | 8/1966 | Lewis | ................ | 220/4.25 |
| 3,301,293 A * | 1/1967 | Santelli | ............... | 220/666 |
| 3,939,607 A * | 2/1976 | Spector | ............... | 47/69 |
| 3,995,396 A * | 12/1976 | Spector | ............... | 47/69 |
| 4,304,068 A * | 12/1981 | Beder | ................. | 47/17 |
| 5,313,912 A * | 5/1994 | O'Dell | ............... | 119/246 |
| D351,686 S * | 10/1994 | O'Dell | ............... | D30/106 |
| D403,587 S * | 1/1999 | Thornley et al. | ........ | D9/683 |
| 6,041,740 A * | 3/2000 | Newman | ............ | 119/261 |
| 6,520,117 B1 * | 2/2003 | Wood | ............... | 119/246 |
| 6,612,453 B2 * | 9/2003 | Joo-Tai | ............ | 220/9.2 |
| 6,637,151 B1 * | 10/2003 | Tillman | ............ | 47/1.7 |
| 6,681,718 B1 * | 1/2004 | McIlarky | .......... | 119/53 |
| 6,830,170 B2 * | 12/2004 | Abel | ............... | 224/634 |
| 6,898,899 B2 * | 5/2005 | Weder | ............. | 47/72 |
| 6,942,097 B1 * | 9/2005 | Stremple et al. | .... | 206/457 |
| 7,025,018 B2 * | 4/2006 | Goossen | ........... | 119/246 |
| 7,028,635 B1 * | 4/2006 | Eastman, II | ........ | 119/51.11 |
| 7,040,249 B1 * | 5/2006 | Mushen | ............ | 119/51.5 |
| 7,390,011 B1 * | 6/2008 | Hem | ................ | 280/638 |
| 7,415,839 B2 * | 8/2008 | Robertson et al. | .... | 62/464 |
| 7,484,475 B2 * | 2/2009 | Milliner | ............ | 119/52.1 |
| 2004/0144028 A1 * | 7/2004 | Weder | ............ | 47/72 |
| 2007/0126600 A1 * | 6/2007 | Huang | ............. | 340/908 |

FOREIGN PATENT DOCUMENTS

| | | |
|---|---|---|
| EP | 0611700 | 8/1994 |
| JP | 5000105 | 1/1993 |
| JP | 05308898 | 11/1993 |
| JP | 11346563 | 12/1999 |
| JP | 2002053179 | 2/2002 |
| KR | 20003250 | 2/2000 |

OTHER PUBLICATIONS

PCT International Search Report No. PCT/US2007/069628 dated Dec. 11, 2007.

* cited by examiner

*Primary Examiner*—Yvonne R. Abbott
(74) *Attorney, Agent, or Firm*—Rader, Fishman & Grauer, PLLC

(57) ABSTRACT

A wildlife containment system, including a lid that may be attached to a selectively extensible support member, which in turn may be attached to a base member. The lid may be selectively removable from the extensible support member to allow for improved maintenance and use of the containment system.

20 Claims, 7 Drawing Sheets

COLLAPSIBLE WILDLIFE CONTAINMENT APPARATUS

FIELD

Described herein is a tank for keeping small land-based or aquatic animals.

BACKGROUND

The use of aquariums for keeping fish has generally been known for some time. Many aquariums are typically of quadrangular construction, with a plurality of viewing panels being joined together by glue or other mechanical fastening mechanisms to form the main tank. Lights and other equipment are generally mounted directly on the top of the aquarium or on one or more viewing panels of the aquarium.

These aquariums typically suffer from several drawbacks which inhibit their use, maintenance, and enjoyment. The view into the aquarium is generally restricted by aquarium lights and other equipment when they are mounted on the top of the aquarium or viewing panels. The view may also be restricted by any corner seams between the viewing panels of the aquarium. These seams are especially inhibiting of the view into aquariums of quadrangular construction in particular. As a result, users are generally required to mount the aquariums at such a height that the aquarium may be viewed directly from the side, otherwise the user will be forced to bend down to look into the side of the aquarium. Regardless of how high the aquarium is mounted, the corner seams may still restrict the view into the aquarium. Additionally, the view into the aquarium is typically restricted by the back panel, which is often opaque and used for attaching filters, lights, or other equipment.

Furthermore, these aquariums also generally offer little or no storage for food and other supplies. Users typically have to store food and other supplies separately from the aquarium as a result.

Finally, the panels of the aquarium are generally always required to be in contact with any water contained inside the aquarium. Any fish or wildlife must be removed and placed in another aquarium, and the entire tank must be drained, before replacing or repairing any panel of the aquarium or any other items in the interior of the aquarium.

More recently, smaller aquariums have been developed which have become popular as inexpensive alternatives to larger, more complex and expensive tanks. However, the disadvantages typical of the larger aquariums are generally exacerbated by the smaller dimensions of these aquariums, since the viewing area into the tank is at least proportionally smaller. Additionally, by virtue of the decreased outer surface area of the smaller aquarium, there is reduced mounting space for lights, pumps and other equipment.

Accordingly, there is a need in the art for an aquarium which can adequately contain fish and other small animals, and also allow for an improved view into the aquarium, easier repair and maintenance of the tank, and/or convenient storage areas for food and other supplies.

SUMMARY

Various embodiments directed to a wildlife containment apparatus are disclosed herein. The wildlife containment apparatus generally includes a base member, a selectively extensible support member attached to the base member, and a lid attached to the extensible support member.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

DETAILED DESCRIPTION

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
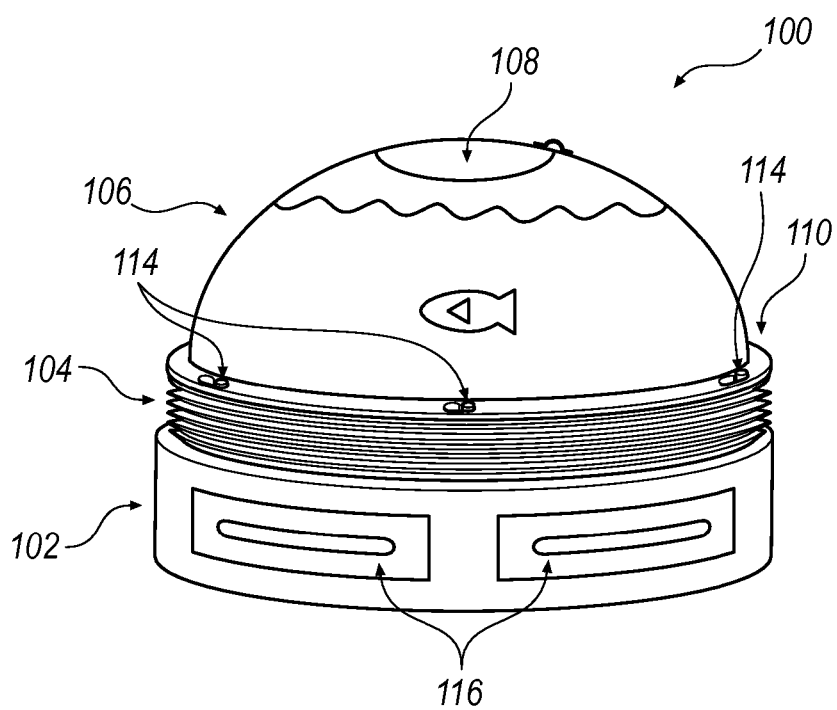
FIG. 1 is an isometric view of a wildlife containment apparatus, according to an embodiment.

FIG. 1 illustrates a wildlife containment apparatus 100 according to an embodiment. Wildlife containment apparatus 100 generally comprises base member 102, selectively extensible support member 104, and lid 106. Wildlife containment apparatus 100 may be employed for keeping any aquatic or other wildlife, e.g., fish, turtles, or land-based animals, as well as any materials or objects necessary for their sustenance, e.g., water, plants, rocks, sand, etc.

Base member 102 generally provides structural support and stability for wildlife containment apparatus 100, which may ideally be installed on a table, floor, or any other generally flat surface. Base member 102 may be of virtually any size or shape that may be convenient. While base member 102 is shown in FIG. 1 generally mirroring the shape of extensible support member 104 and lid 106, other embodiments are possible where base member 102 does not mirror the shape of extensible support member 104 or lid 106. Base member 102 may be provided with openings 116, which may allow for storage areas, sliding drawers, or virtually any other storage device to be provided in the interior of base member 102. Base member 102 may additionally have other convenient features in addition to or instead of those described here, as will be discussed below in further detail with reference to FIGS. 4 and 5.

Extensible support member 104 may be permanently or non-permanently attached to base member 102. Extensible support member 104 may be attached by any manner known in the art. For applications where wildlife containment apparatus 100 is used for keeping aquatic wildlife, extensible support member 104 is preferably attached to base member 102 in such a manner as to provide a fluid tight seal between extensible support member 104 and base member 102, thereby preventing leakage of water or other fluids contained within wildlife containment apparatus 100. A rubber gasket (not shown) may be provided between base member 102 and extensible support member 104 to enhance the watertight nature of the joint between base member 102 and extensible support member 104. Alternatively or in addition to the gasket, an adhesive, glue, or other sealant (not shown) may be applied about the interface between base member 102 and extensible support member 104 to enhance the seal therebetween.

Figure 7:
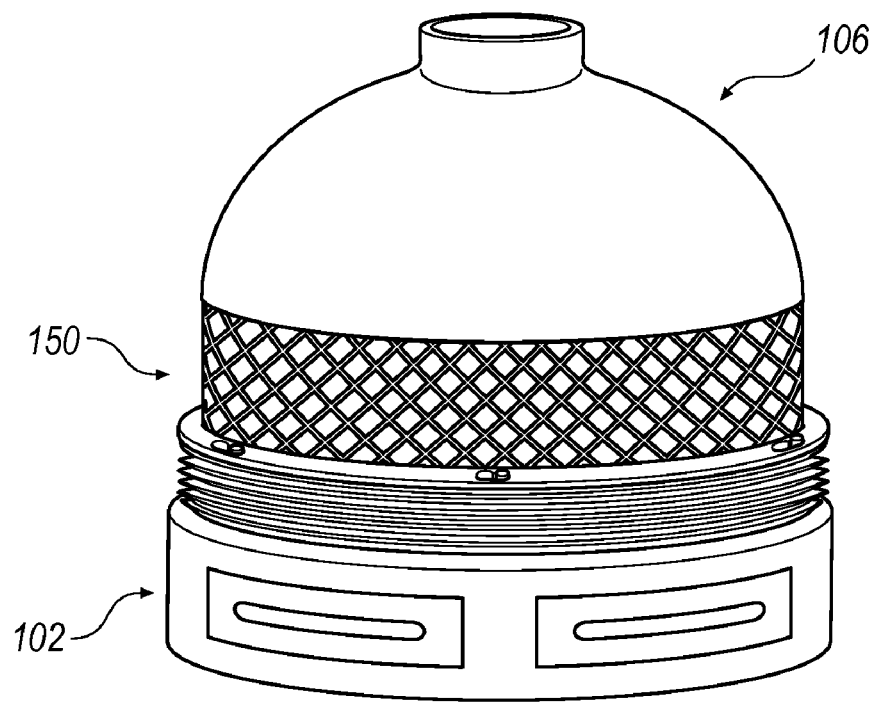
FIG. 7 is an isometric view of a wildlife containment apparatus having a ventilation fence integrated with a lid, according to an embodiment.

Lid 106 may be mounted upon extensible support member 104 by any manner known in the art that will adequately prevent leakage of any water or other fluids contained within wildlife containment apparatus 100, especially for aquatic wildlife applications. As shown in FIG. 1, lid 106 may have a generally rounded bubble shape, such that lid 106 provides a generally seamless viewing panel about a perimeter of wildlife containment apparatus 100. As one example, lid 106 may have a lip 110 which sits upon a top edge of extensible support member 104. Key-hole slots 112 in lip 110 may engage features disposed upon a top edge of extensible support member 104 such as posts 114. As such, lid 106 may be attached to extensible support member 104 by placing lid 106 upon extensible support member 104 such that posts 114 extend through a larger portion of key-hole slots 112, and turning lid 106 in such a direction that a smaller portion key-hole slots 112 positively engage posts 114. One of skill in the art will recognize that any other mechanism of attaching lid 106 to extensible support member 104 may be utilized. For example, a simple clamping mechanism may be provided as an alternative or in addition to the key-hole slot and post arrangement illustrated in FIGS. 1-3. Virtually any mechanism for attaching lid 106 to extensible support member 104 may be used so long as a proper seal is formed between lid 106 and extensible support member 104 to prevent any leakage of water or other fluids. The method of attaching lid 106 to extensible support member 104 would preferably also allow for the easy removal and reinstallation of lid 106 to extensible support member 104. For applications where wildlife containment apparatus 100 is used for keeping animals that do not require containing water within wildlife containment apparatus 100, one or more apertures may be provided in lid 106 for ventilating an interior area of wildlife containment apparatus 100. For example, a portion of lid 106 may incorporate a fence or mesh 150 (see FIG. 7) that generally freely allows ventilation of wildlife containment apparatus 100, while also preventing escape of wildlife contained therein.

Figure 1A:
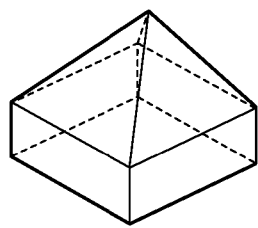
FIGS. 1A-1C are isometric views of various wildlife containment apparatus shapes, according to various embodiments.
Figure 1B:
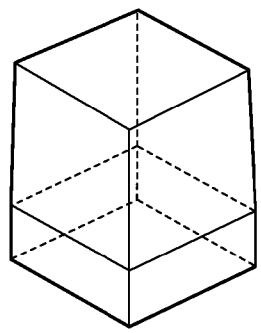
Figure 1C:
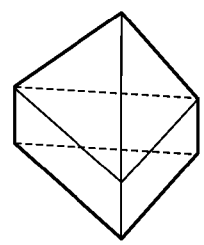

Those skilled in the art will immediately recognize that shapes and sizes of wildlife containment apparatus 100 are possible other than the rounded bubble shape shown in FIG. 1. Other embodiments may use a quadrangular shape, triangular shape, or square shape as shown in FIGS. 1A-1C. It should be noted that aquariums according to the various embodiments may be adapted to virtually any other shape that may be convenient. Furthermore, wildlife containment apparatus 100 may be used to contain objects or things other than the aquatic or land-based wildlife specifically described herein.

Lid 106 may also be provided with a variety of features for customizing wildlife containment apparatus for specific applications. For example, lid 106 may be formed with ledges or shelves (not shown) on the interior of lid 106, to allow for land-based animals to crawl about such features. Lid 106 may also be formed with viewing features such as a magnifying pane (not shown) for viewing smaller animals contained within wildlife containment apparatus 100. Further, lid 106 may be assembled with interaction features that allow a user to manipulate animals or materials within wildlife containment apparatus 100. For example, a rubber or otherwise flexible feature, e.g., a rubber glove (not shown), may be sealed about an external aperture of lid 106, such that a user may interact with animals or objects within wildlife containment apparatus 100 by manipulating the flexible feature, e.g., by placing their hand into the glove to "touch" things inside wildlife containment apparatus 100. Any other known feature commonly employed in aquarium or wildlife containment applications may be formed or assembled with lid 106, as may be convenient.

Additionally, the selectively removable lid 106 is generally interchangeable with other lids. A user can thus use a wildlife containment apparatus 100 with a lid 106 having features designed for a particular application, e.g., ventilation features for keeping land animals, and later exchange lid 106 for another lid having features designed for a different application, e.g., a sealed lid having a seamless viewing pane for keeping aquatic animals. Accordingly, a single wildlife containment apparatus 100 may be used for a variety of different applications by replacing lid 106 with other lid(s) having features specifically suited for different applications.

Figure 2:
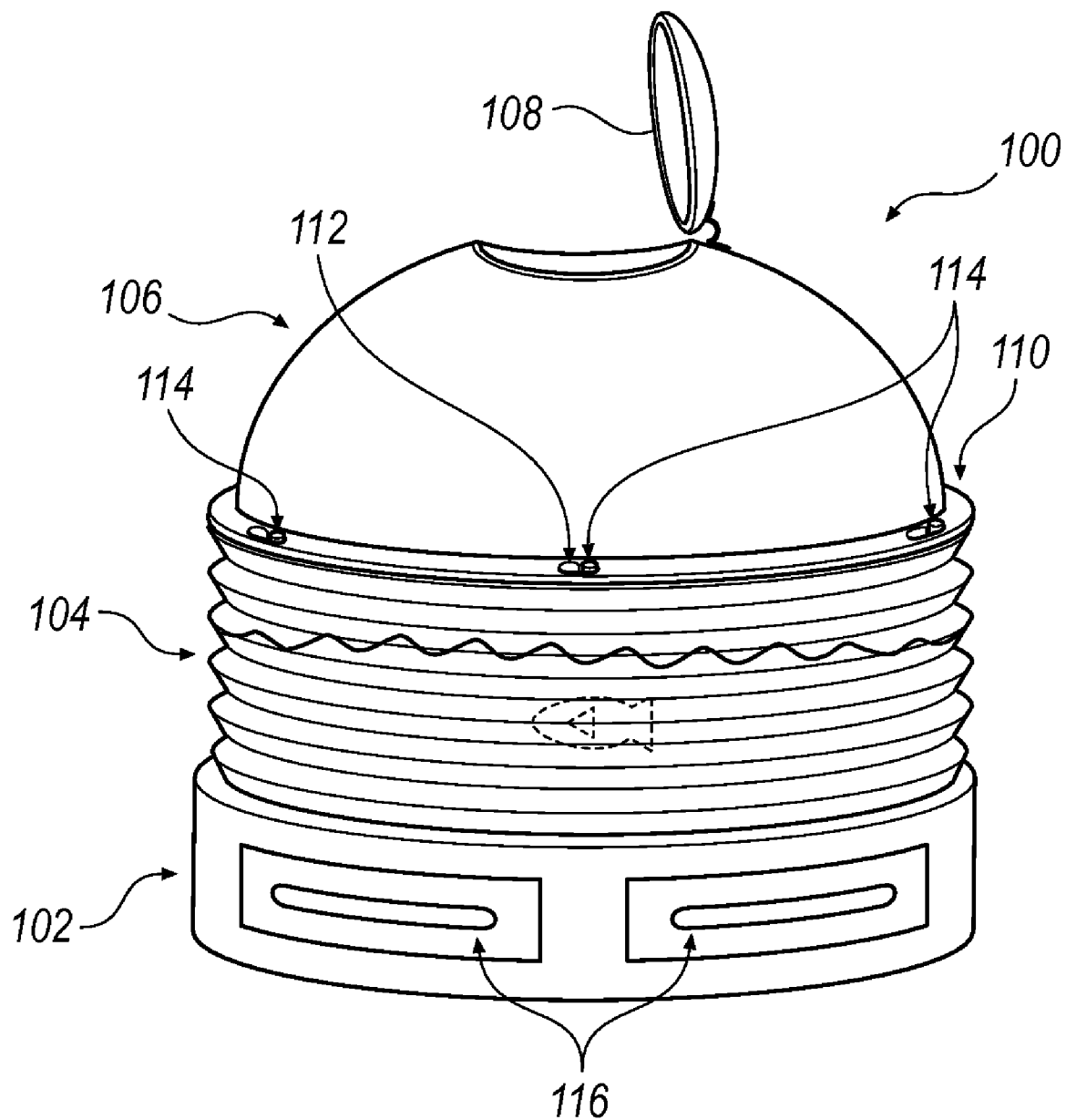
FIG. 2 is an isometric view of a wildlife containment apparatus with an extensible support member in an extended position, according to an embodiment.

Turning now to FIG. 2, the general manner in which lid 106 may be removed from wildlife containment apparatus 100 for cleaning or accessing the interior of wildlife containment apparatus 100 will be explained. Lid 106 may be provided with a cap or hatch 108 which may generally be closed during use of wildlife containment apparatus 100 to prevent escape of any water or other fluids, fish, or any other animals or objects. The closure of hatch 108 will also preferably prevent the intrusion of any foreign matter into the aquarium. When it is desired to remove lid 106 from wildlife containment apparatus 100, or to access the interior of wildlife containment apparatus 100, e.g., for feeding wildlife, hatch 108 may be opened. Extensible support member 104 may be gradually extended upwards, such that lid 106 is raised upwards. For aquatic wildlife applications, hatch 108 allows air to enter a top portion of wildlife containment apparatus 100 as extensible support member 104 is extended, thereby allowing the waterline of the water contained by wildlife containment apparatus 100 to fall below lid 106 and within extensible support member 104.

Figure 3:
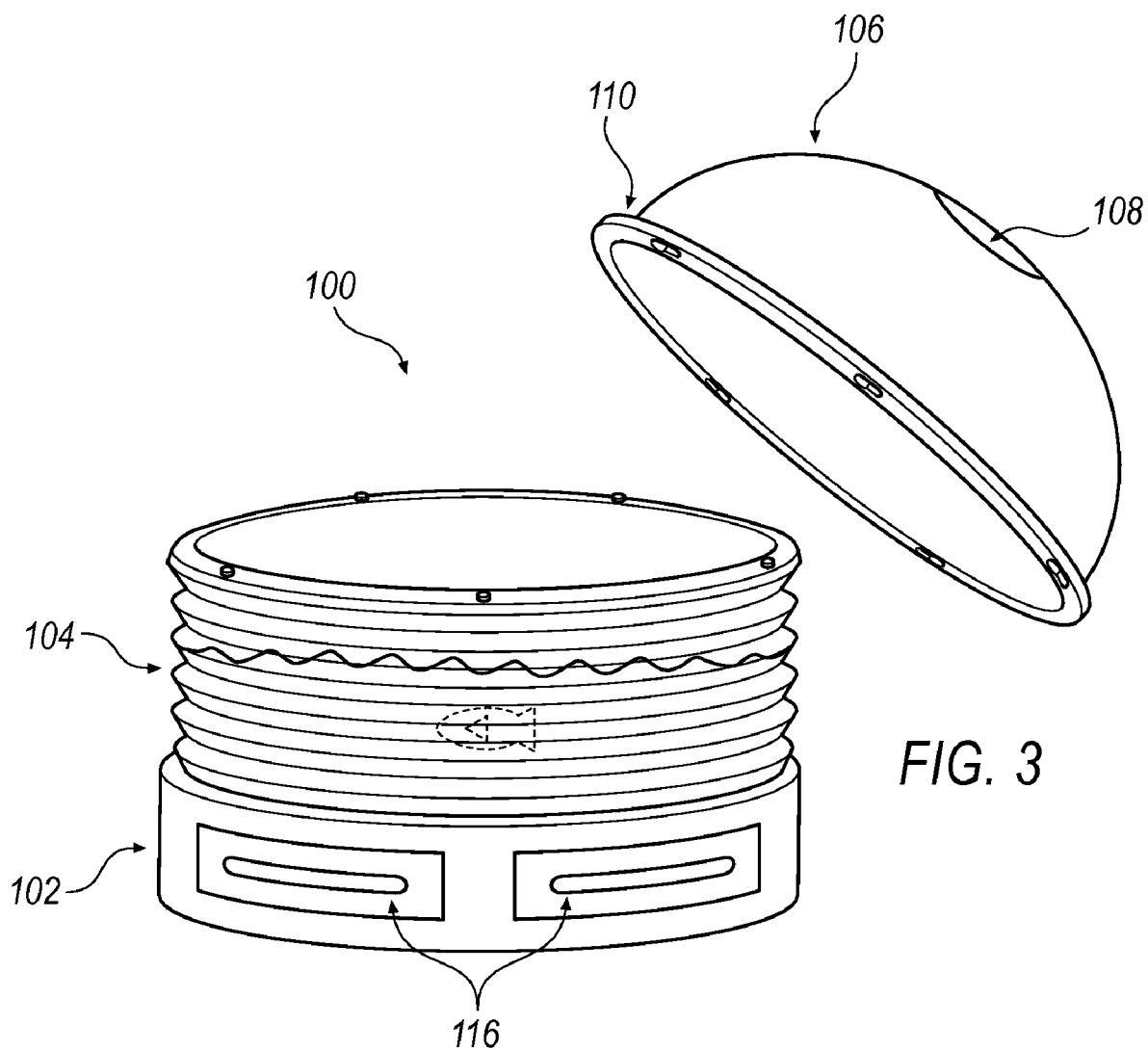
FIG. 3 is an isometric view of a wildlife containment apparatus with an extensible support member in an extended position and lid removed, according to an embodiment.

Turning now to FIG. 3, lid 106 may be removed from extensible support member 104 after lid 106 is raised above the waterline of wildlife containment apparatus 100. Extensible support member 104 is preferably provided with enough height to adequately contain all of the water and any other fluids or objects that may be kept within wildlife containment apparatus 100. More specifically, when extensible support member 104 is in its extended position, extensible support member 104 may cooperate with base member 102 to define a volume that is at least as great as the volume generally defined by the lid 106, base member 102, and extensible support member 104 in its retracted position. Lid 106 may thus be easily removed from wildlife containment apparatus 100 for cleaning, placing objects or food within wildlife containment apparatus 100 or removing objects therefrom, or any other reason it would be desirable to access the interior of wildlife containment apparatus 100. When extensible support member 104 is extended it preferably contains any water, wildlife, or other objects kept in wildlife containment apparatus 100. It is therefore generally not necessary to drain water from wildlife containment apparatus 100, or otherwise remove fish, other animals, material, or objects from wildlife containment apparatus 100 in order to properly clean wildlife containment apparatus 100 or otherwise access and maintain any living or non-living objects kept within wildlife containment apparatus 100.

Figure 4:
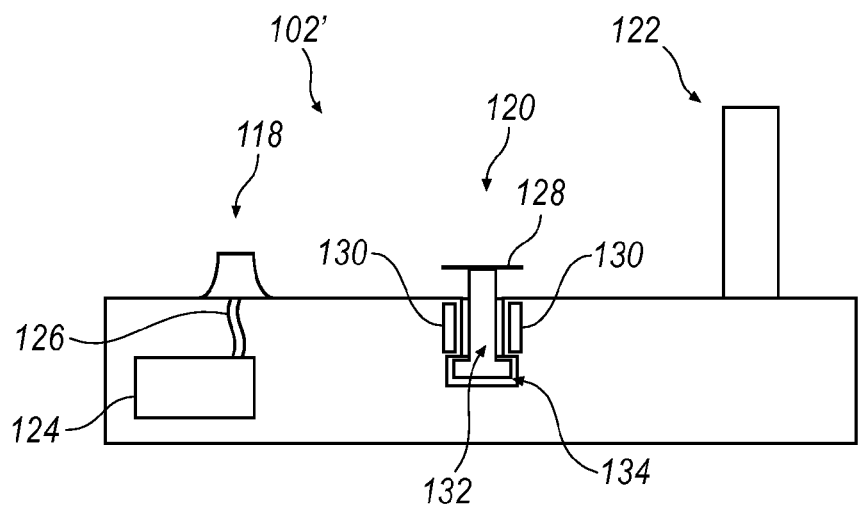
FIG. 4 is a partial section view of a base member of a wildlife containment apparatus, according to an embodiment.

Turning now to FIG. 4, other convenient features which may be provided in base member 102' are illustrated. One of skill in the art will recognize that the features described in FIG. 4 may be provided as shown, in combination with, or instead of features shown in other examples of the base member described herein. A one-way valve 118 may be provided in base member 102' for the pumping of air or other fluids into wildlife containment apparatus 100 without removal of lid 106. One-way valve 118 allows the flow of fluids or gases into wildlife containment apparatus 100 from below a top surface of base member 102' without allowing the escape of water or other fluids from wildlife containment apparatus 100. One-way valve 118 may be used as part of an aeration system comprising at least a pump 124 and hose 126. One-way valve 118 generally allows the insertion of a stream of any fluid or gas into wildlife containment apparatus 100. Preferably pump 124 is used to pump air through hose 126 and through one-way valve 118 to oxygenate water within wildlife containment apparatus 100.

Base member 102' may also be provided with a propeller assembly 120. Propeller assembly 120 may be utilized to agitate or distribute water or other fluids within wildlife containment apparatus 100. Propeller assembly 120 generally comprises a propeller 128 fixed upon a propeller shaft 132 for rotation therewith. Propeller shaft 132 is housed within a cavity 134, which is set within base member 102' to allow water to flow into cavity 134 and surround propeller shaft 132. Propeller shaft 132 may be acted upon by a magnet 130, which sits within base member 102' and therefore does not contact water or other fluids within wildlife containment apparatus 100. Magnet 130 may be an electromagnet with a power supply (not shown) which may selectively spin and control the rotation of propeller shaft 132. Propeller shaft 132 is preferably formed of or coated with a material or substance responsive to the magnetic field provided by magnet 130. As thus described, propeller assembly 120 provides agitation to water or any other fluid contained within wildlife containment apparatus 100 while being relatively simple and inexpensive to use, maintain, and replace.

Figure 4A:
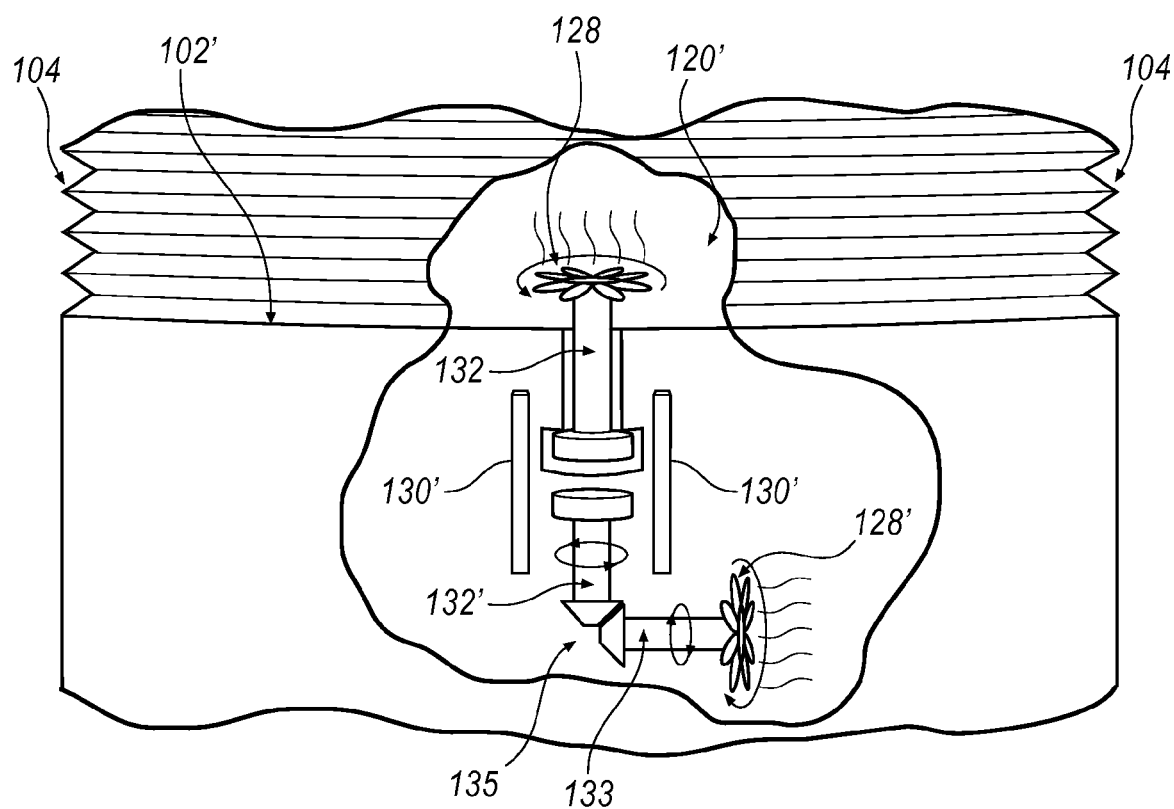
FIG. 4A is a partial section view of a base member of a wildlife containment apparatus, according to an embodiment.

Turning now to FIG. 4A, a dual propeller assembly 120' for base member 102' is illustrated according to an embodiment. Dual propeller assembly 120' comprises a propeller 128 and a propeller shaft 132, similar to propeller assembly 120 shown in FIG. 4. Dual propeller assembly 120' additionally comprises a secondary propeller 128' which provides cooling air to devices in base member 102'. A magnet 130' acts upon both propeller shaft 132 and second propeller shaft 132'. Second propeller shaft 132' may in turn act upon a secondary propeller stem 133 through an interlocking gear assembly 135. Secondary propeller 128' is fixed to secondary propeller stem 133 for rotation therewith. As such, a single magnet 130' can be utilized to turn and control both propeller 128 which agitates and distributes water within wildlife containment apparatus 100, and secondary propeller 128' which may provide cooling air to equipment within base member 102'. At the same time, second propeller shaft 132' remains dry and is protected from water and moisture from wildlife containment apparatus 100. Although dual propeller assembly 120' is shown with multiple shafts through interlocking gears, other embodiments are possible utilizing a single magnet 130' that do not utilize interlocking gears. For example, secondary propeller 128' may be affixed to second propeller shaft 132', and any airflow from secondary propeller 128' may be controlled by a vent or series of vents to direct cooling air to equipment beneath base member 102'.

Turning back to FIG. 4, base member 102' is shown as also comprising a protein skimmer 122. Protein skimmer 122 may be attached to base member 102' by any method known in the art. Protein skimmer 122 is most preferably a venturi or air-driven protein skimmer, however protein skimmer 122 may be any other type of skimmer known in the art, such as a needle wheel protein skimmer or downdraft protein skimmer, as non-limiting examples. Protein skimmer 122 may rely on any mechanism known in the art to agitate water for the purpose of protein skimming, including, but not limited to, pump 124 or a propeller assembly similar to propeller assembly 120 or 120' as described herein. A collection cup (not shown) for collecting contaminants removed by protein skimmer 122 may be disposed anywhere convenient, such as an outer surface of lid 106, or within a storage drawer or compartment in base member 102' such as opening 116 as described herein.

Figure 5:
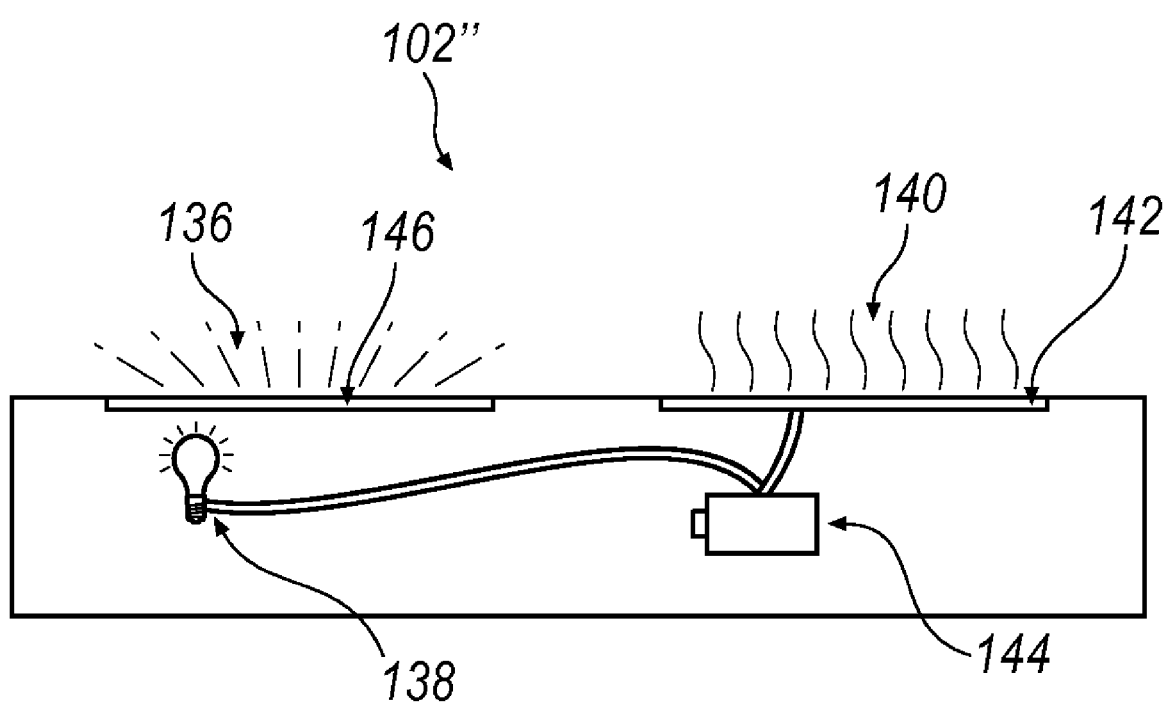
FIG. 5 is a partial section view of a base member of a wildlife containment apparatus, according to an embodiment.

Turning now to FIG. 5, other convenient features which may be provided in base member 102" are illustrated. One of skill in the art will recognize that the features described in FIG. 5 may be provided as shown, in combination with, or instead of other features of the base members described herein. Base member 102" comprises a light assembly 136 and a peltier device 140. Light assembly 136 generally comprises a window 146 mounted in an upper surface of base member 102, and a light 138. Light assembly may comprise as many lights 138 as may be necessary to adequately provide light to the interior of wildlife containment apparatus 100. Window 146 ideally allows a maximum of light rays from light 138 to be directed into wildlife containment apparatus 100 while protecting light 138 from any water or fluid which may be contained within wildlife containment apparatus 100. Light 138 may be a fluorescent light or any other type of light commonly known in the art, and may generally be powered by a battery 144 or any other electrical power supply. Light 138 may also be an ultra-violet light which prevents the buildup of bacteria in water contained in the aquarium. Light 138 and battery 144 are kept dry by being separated from the interior of wildlife containment apparatus 100 by window 146, and preferably can be maintained and/or replaced without accessing the interior of wildlife containment apparatus 100. For example, a removable side or bottom panel of base member 102" (not shown) could be opened to access the interior of base member 102" and any mechanical parts of the various features described herein.

Peltier device 140 may also be provided to control the temperature of the water inside wildlife containment apparatus 100. Peltier device 140 may generally comprise a temperature plate 142 which sits on an upper surface of base member 102". Ideally temperature plate 142 should provide an adequately large surface area facing the water contained in the interior of wildlife containment apparatus 100, such that temperature plate 142 can conduct heat to and from the water. Peltier device 140 thus can maintain the water inside wildlife containment apparatus 100 at a proper temperature to promote the health of any living wildlife kept in wildlife containment apparatus 100. Peltier device 140 can be powered by battery 144 or any other electrical power supply, and may be powered by the same electrical power supply as light assembly 136.

Figure 6:
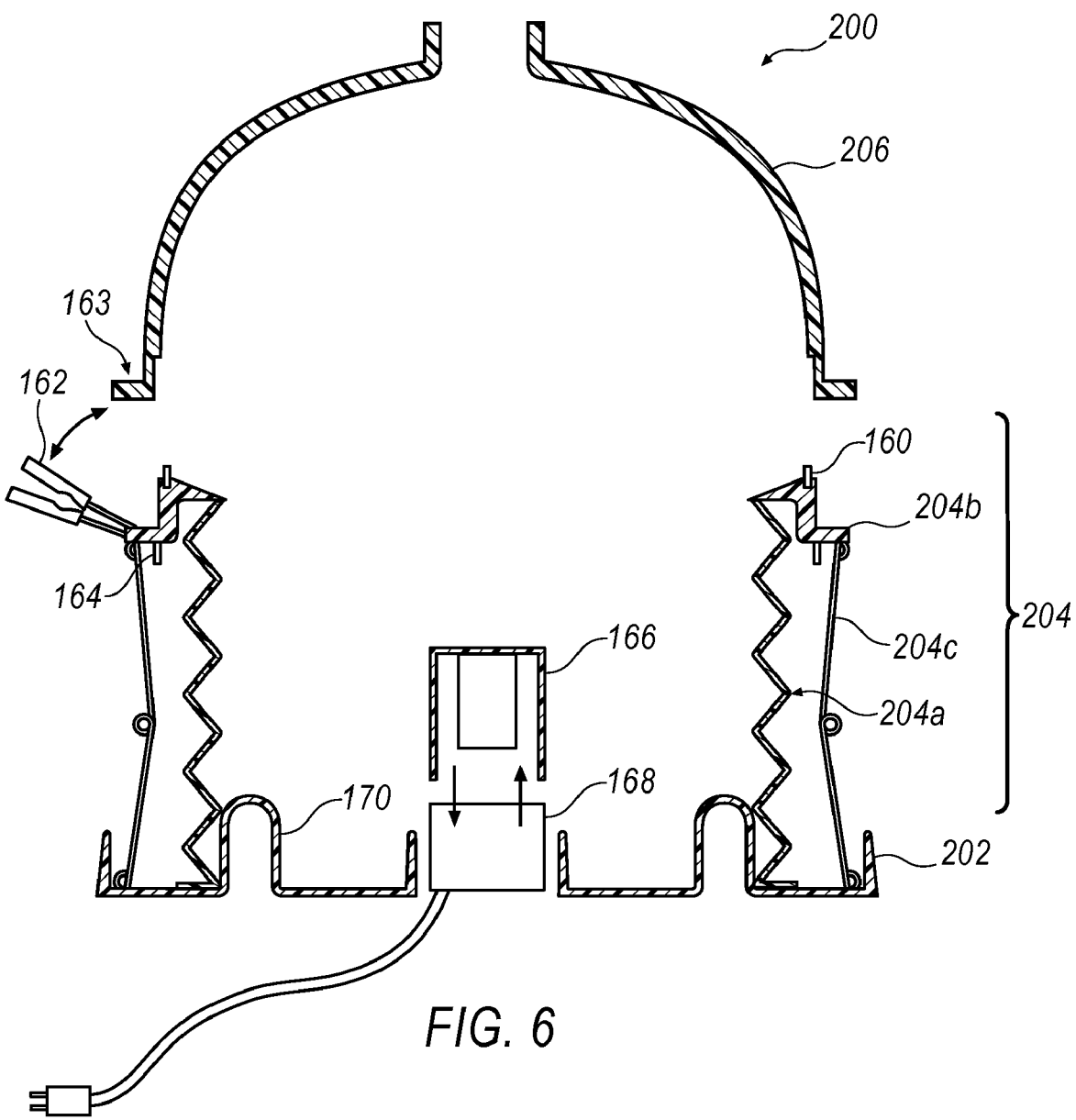
FIG. 6 is a partial section view of a wildlife containment apparatus, according to an embodiment.

Turning now to FIG. 6, an additional example of a wildlife containment apparatus 200 is shown. Wildlife containment apparatus 200 generally includes a base member 202 and a lid 206 that are generally similar to base member 102 and lid 106 described above. Base member 202 may include an annular ring defining a volume beneath base member 202 for housing various features described herein or otherwise known, e.g., a light for illuminating an interior of wildlife containment apparatus 200. Wildlife containment apparatus 200 further includes an extensible support member 204 that includes a flexible bellows 204a, a bezel 204b, and a spring element 204c. Bellows 204a may be secured to base 202 and bezel 204b. Spring element 204c may also be secured to base 202 and bezel 204b, generally biasing bezel 204b away from base 202. Bellows 204a expands as bezel 204b is urged upwards, and preferably is sealed at the interfaces between bellows 204a and each of bezel 204b and base 202 to prevent fluids, e.g., water or air, from escaping the interior of wildlife containment apparatus 200. Additionally, bezel 204b or lid 206 may be provided with a gasket 160 to generally seal the interface between bezel 204b and lid 206.

Bezel 204b may be retained in a retracted position against base 202 with any known retaining mechanism. A retaining mechanism may be provided on one of bezel 204b or base member 202 for engaging the other of bezel 204b or base member 202 to retain bezel 204b against base member 202, to maintain extensible support member 204 in a retracted position. For example, as shown in FIG. 6, one or more clips 164 may be provided on an underside of bezel 204b that engage a corresponding feature (not shown) in base member 202. Clips 164 may be released from engagement with base member 202 with any known mechanism. Additionally, any known retaining mechanism may be provided on either bezel 204b or lid 206 for retaining lid 206 to bezel 204b. For example, as shown in FIG. 6, one or more clamps 162 may be provided on bezel 204b that engage a flange 163 of lid 206 to retain lid 206 to bezel 204b.

Wildlife containment apparatus 200 may also be provided with a filter 166 and pump 168 for aquatic applications that are integrated with base 202. Pump 168 may be located in a surface of base member 202 that communicates with an interior of wildlife containment apparatus 200. Pump 168 may be provided with a filter element 166 that receives water from the interior of wildlife containment apparatus 200, and returns filtered water back to the interior of wildlife containment apparatus 200 after pump 168 forces the water through filter element 166. Filter element 166 is preferably removable from pump 168 for simplified cleaning or replacement.

Filter element 166 or pump 168 may be covered or hidden from view with a decorative sleeve (not shown) that fits over filter 166 or pump 168. A decorative sleeve preferably has at least one aperture or screen to allow fluid communication through the decorative sleeve. Accordingly, a filter 166 or pump 168 may be provided for any wildlife containment apparatus that does not interfere with the overall aesthetic appeal of the wildlife containment apparatus.

Figure 8:
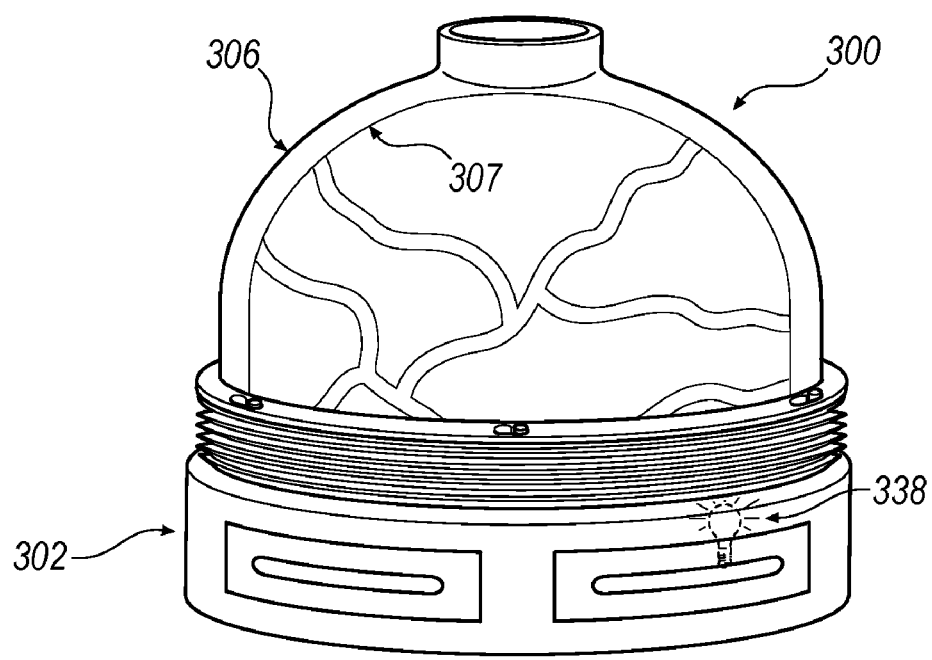
FIG. 8 is a partial section view of a wildlife containment apparatus having a dual-surface lid, according to an embodiment.

Turning now to FIG. 8, a wildlife containment system 300 is illustrated with a lid 306 that has a secondary sleeve 307. Secondary sleeve 307 provides a support surface which cooperates with the interior surface of lid 306 to define a relatively thin volume area, such as for an ant farm or worm farm. Accordingly, the area disposed between secondary sleeve 307 and lid 306 may be filled with dirt or any other material as may be convenient for such applications. Secondary sleeve 307 may be secured to lid 306 or base member 302, as may be convenient. Additionally, a light 338 may be provided in base member 302, to provide light to an ant or worm farm from the interior of wildlife containment system 300.

Accordingly, the various embodiments of a wildlife containment apparatus described above generally allow for easy cleaning, and modification or removal of objects or wildlife kept within the wildlife containment apparatus by extending the extensible support member and removing the lid, as the extensible support member contains any water, animals, materials, or other objects within the wildlife containment apparatus while the lid is removed.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the claims of any subsequent utility application, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation, and is limited only by the claims contained in a relevant subsequent utility application.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A wildlife containment apparatus comprising:

a base member;

a selectively extensible support member attached to said base member, wherein said extensible support member is selectively extensible between a retracted position wherein an end of said extensible support member is disposed generally adjacent said base member, and an extended position wherein said end of said extensible support member is longitudinally spaced away from said base member; and a lid attached to said extensible support member;

wherein said lid cooperates with said base member and said extensible support member to define a first volume when said extensible support member is in said retracted position, and said extensible support member cooperates with said base member to define a second volume when said extensible support member is in said extended position, said second volume being at least equal to said first volume; and wherein said lid defines at least a portion of said first volume, and said lid defines a viewing panel permitting viewing of said portion of said first volume when said extensible support member is in said refracted position.

2. The wildlife containment apparatus of claim 1, wherein said extensible support member includes a flexible bellows.

3. The wildlife containment apparatus of claim 1, wherein said lid is selectively removable from said extensible support member.

4. The wildlife containment apparatus of claim 1, wherein said viewing panel extends about a perimeter of said lid.

5. The wildlife containment apparatus of claim 4, wherein said viewing panel is generally seamless about said perimeter.

6. The wildlife containment apparatus of claim 1, wherein said extensible support member and said base member form a generally fluid-tight interface when said extensible support member is extended such that a liquid included in said first volume is contained within the extensible support member, thereby permitting removal of said lid when said extensible support member is in said extended position.

7. The wildlife containment apparatus of claim 1, further comprising a gasket disposed on one of said lid and said extensible support member, said gasket operable to generally seal an interface between said lid and said extensible support member.

8. The wildlife containment apparatus of claim 1, wherein said lid includes a hatch operable to provide access to an interior of said lid when said lid is attached to said extensible support member.

9. The wildlife containment apparatus of claim 1, wherein said lid includes at least one aperture for allowing ventilation of an interior of said lid when said lid is secured to said extensible support member.

10. The wildlife containment apparatus of claim 1, wherein one of said lid and said extensible support member has at least one attachment member for engaging the other of said lid and said extensible support member to selectively secure said lid to said extensible support member.

11. The wildlife containment apparatus of claim 10, wherein said at least one attachment member includes a post operable to engage a keyhole slot disposed on said other of said lid and said extensible support member.

12. The wildlife containment apparatus of claim 1, wherein said base member has at least one retention mechanism operable to retain said extensible support member in a retracted position.

13. The wildlife containment apparatus of claim 12, wherein said at least one retention mechanism includes a clamp.

14. The wildlife containment apparatus of claim 1, further comprising a spring biasing said extensible support member into an extended position.

15. The wildlife containment apparatus of claim 1, wherein said extensible support member generally mirrors a shape of said base member.

16. The wildlife containment apparatus of claim 1, wherein said base member includes a storage compartment.

17. The wildlife containment apparatus of claim 1, wherein said lid defines substantially all of said first volume.

18. The wildlife containment apparatus of claim 1, wherein said viewing panel extends along substantially all of a longitudinal extent of said lid to permit lateral viewing through substantially all of said portion of said first volume when said extensible support member is in said retracted position.

19. A wildlife containment system, comprising:
a base member;
a selectively extensible support member attached to said base member; and
a lid attached to said extensible support member, said lid selectively removable from said extensible support member;
wherein said lid cooperates with said base member and said extensible support member to define a first volume when said extensible support member is in a first position; and
wherein said extensible support member cooperates with said base member to define a second volume when said extensible support member is in a second position, said second volume being at least equal to said first volume;
wherein an end of said extensible support member is disposed generally adjacent said base member when said extensible support member is in said first position, and said end of said extensible support member is spaced away from said base member when said extensible support member is in said second position; and
wherein said lid defines at least a portion of said first volume, and said lid defines a viewing panel permitting viewing of said portion of said first volume when said extensible support member is in said first position.

20. A wildlife containment system, comprising:
a base member, said base member having a cavity disposed on an upper surface of said base member;
a selectively extensible support member attached to said base member;
a lid attached to said extensible support member;
a propeller shaft disposed at least partially within said cavity;
a propeller fixed at an end of said propeller shaft; and
a magnet disposed proximate said cavity; said magnet operable to create a magnetic field about said propeller shaft.

* * * * *